US009019221B2

(12) United States Patent
Cho

(10) Patent No.: US 9,019,221 B2
(45) Date of Patent: Apr. 28, 2015

(54) DISPLAY DEVICE INTEGRATED WITH TOUCH SCREEN PANEL

(71) Applicant: Samsung Display Co., Ltd., Yongin, Gyeonggi-Do (KR)

(72) Inventor: Se-Il Cho, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 116 days.

(21) Appl. No.: 13/665,572

(22) Filed: Oct. 31, 2012

(65) Prior Publication Data

US 2014/0035839 A1 Feb. 6, 2014

(30) Foreign Application Priority Data

Jul. 31, 2012 (KR) .................. 10-2012-0083823

(51) Int. Cl.
| | |
|---|---|
| *G06F 3/041* | (2006.01) |
| *G06F 3/044* | (2006.01) |
| *G09G 3/00* | (2006.01) |
| *G06F 3/0488* | (2013.01) |

(52) U.S. Cl.
CPC ............ *G06F 3/0412* (2013.01); *G06F 3/0488* (2013.01); *G06F 3/044* (2013.01); *G09G 3/00* (2013.01)

(58) Field of Classification Search
CPC ................ G06F 3/041–3/045; G09G 5/00
USPC .................................. 345/156–178; 359/599
See application file for complete search history.

(56) References Cited

U.S. PATENT DOCUMENTS

| | | | |
|---|---|---|---|
| 8,259,240 | B2 | 9/2012 | Han |
| 2008/0062139 | A1* | 3/2008 | Hotelling et al. ............. 345/173 |
| 2010/0013745 | A1 | 1/2010 | Kim et al. |
| 2010/0171419 | A1 | 7/2010 | Kim et al. |
| 2012/0044165 | A1 | 2/2012 | Kwak et al. |
| 2012/0086669 | A1 | 4/2012 | Kim et al. |
| 2012/0105381 | A1 | 5/2012 | Lee et al. |
| 2012/0105761 | A1 | 5/2012 | Lee et al. |
| 2012/0106048 | A1 | 5/2012 | Byeon et al. |
| 2012/0106121 | A1 | 5/2012 | Lee et al. |
| 2012/0106122 | A1 | 5/2012 | Ryu et al. |

FOREIGN PATENT DOCUMENTS

| | | |
|---|---|---|
| KR | 10-2010-0010019 | 1/2010 |
| KR | 10-2010-0081771 | 7/2010 |
| KR | 10-2012-0018046 | 2/2012 |
| KR | 10-2012-0045290 | 5/2012 |

* cited by examiner

*Primary Examiner* — Kent Chang
*Assistant Examiner* — Nathan Brittingham
(74) *Attorney, Agent, or Firm* — Robert E. Bushnell, Esq.

(57) ABSTRACT

In a display device integrated with a touch screen panel, light scattering patterns corresponding to regions between dummy patterns are formed in partial regions of first electrodes in order to prevent the first electrodes of the touch screen panel, formed on one surface of the top substrate of the display device, from being visible due to a difference in degrees of scattering light by external light between the first electrodes and the plurality of dummy patterns formed between the first electrodes.

11 Claims, 4 Drawing Sheets

DISPLAY DEVICE INTEGRATED WITH TOUCH SCREEN PANEL

CLAIM OF PRIORITY

This application makes reference to, incorporates the same herein, and claims all benefits accruing under 35 U.S.C. §119 from an application earlier filed in the Korean Intellectual Property Office on the 31 Jul. 2012 and there duly assigned Serial No. 10-2012-0083823.

BACKGROUND OF THE INVENTION

1. Field of the Invention

The present invention relates to a display device, and more particularly, to a display device including an electro-capacitive touch screen panel.

2. Description of the Related Art

A touch screen panel is an input device capable of selecting the indication content displayed on the screen of an image display device by a human hand or an object so as to input the command of a user.

Therefore, the touch screen panel is provided on the entire surface of the image display device so as to convert a contact position of the human hand or the object into an electrical signal. Therefore, the instruction contact selected in the contact position is received as an input signal.

Since the touch screen panel may replace an additional input device coupled to the image display device so as to operate such as a keyboard and a mouse, the use range is gradually increasing.

Methods of realizing a touch screen panel include a resistance layer method, a photo-sensing method, and an electro-capacitive method. Among the above methods, the widely used electro-capacitive touch screen panel detects a change in capacitance formed by conductive sensing patterns together with other peripheral sensing patterns or a ground electrode when the human hand or an object contacts the touch screen panel so as to convert the contact position into the electrical signal.

The electro-capacitive touch screen panel is commonly attached to the external surface of a flat panel display (FPD), such as a liquid crystal display (LCD) and an organic light emitting display (OLED), so as to be produced.

However, when the touch screen panel is attached to the external surface of the FPD, since an adhesive layer between the touch screen panel and the FPD is necessary and processes of manufacturing the touch screen panel are required in addition to the FPD, process time and process cost increase.

In addition, in the conventional structure, the touch screen panel is attached to the external surface of the FPD so that the entire thickness of the FPD increases.

SUMMARY OF THE INVENTION

Accordingly, the present invention has been developed in order to provide a display device integrated with a touch screen panel in which light scattering patterns corresponding to regions between dummy patterns are formed in partial regions of first electrodes of a touch screen panel in order to prevent the first electrodes of the touch screen panel from being visible due to a difference in degrees of scattering light by external light between the first electrodes and the plurality of dummy patterns formed between the first electrodes of the touch screen panel.

In order to achieve the foregoing and/or other aspects of the present invention, there is provided a display device integrated with a touch screen panel, including a first substrate on which a plurality of pixels are formed, a second substrate positioned to face the first substrate and having a plurality of first electrodes arranged in stripes and formed on one surface thereof, and a plurality of island-shaped dummy patterns formed between the plurality of first electrodes. Light scattering patterns are formed in partial regions of the first electrodes.

The light scattering patterns are patterned so as to be engraved or are realized by apertures.

The light scattering patterns include first light scattering patterns formed to protrude from left and right ends of the first electrode to the interior. First light scattering patterns positioned at the left end of the first electrode and first light scattering patterns positioned at the right end of the first electrode are arrange to cross each other.

The first light scattering patterns are arranged to run parallel with regions between dummy patterns adjacent thereto.

The light scattering patterns further include second light scattering patterns arranged to run parallel with the first light scattering patterns in a center of the first electrode. The second light scattering patterns are positioned between the first light scattering patterns adjacent from side to side.

The light scattering patterns further include third light scattering patterns arranged in a direction perpendicular to the first and second light scattering patterns in the center of the first electrode. The third light scattering patterns are positioned between the adjacent second light scattering patterns. Third light scattering patterns adjacent above and below are arranged to cross each other.

The first electrodes are arranged on a top surface of a second substrate. Second electrodes, arranged in a direction that intersects the first electrodes, are formed on a bottom surface of the second substrate. The first electrodes operate as sensing electrodes of a touch screen panel. The second electrodes operate as driving electrodes of the touch screen panel.

As described above, according to the present invention, in integrating the electro-capacitive touch screen panel with the display device, the first electrodes (sensing electrodes) of the touch screen panel are formed on one surface of the top substrate of the display device, and the second electrodes (driving electrodes) corresponding to the first electrodes are used as conductive wiring lines provided in the display device so that a display device integrated with a touch screen panel of minimized thickness is realized.

In addition, in the structure where the plurality of floated dummy patterns are provided between the first electrodes, the light scattering patterns corresponding to the regions between the dummy patterns are formed in the partial regions of the first electrodes so as to prevent the first electrodes from being visible to a user due to the difference in the degrees of scattering light by external light between the first electrodes and the dummy patterns.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

The accompanying drawings, together with the specification, illustrate exemplary embodiments of the present invention, and, together with the description, serve to explain the principles of the present invention.

DETAILED DESCRIPTION OF THE INVENTION

Figure 1:
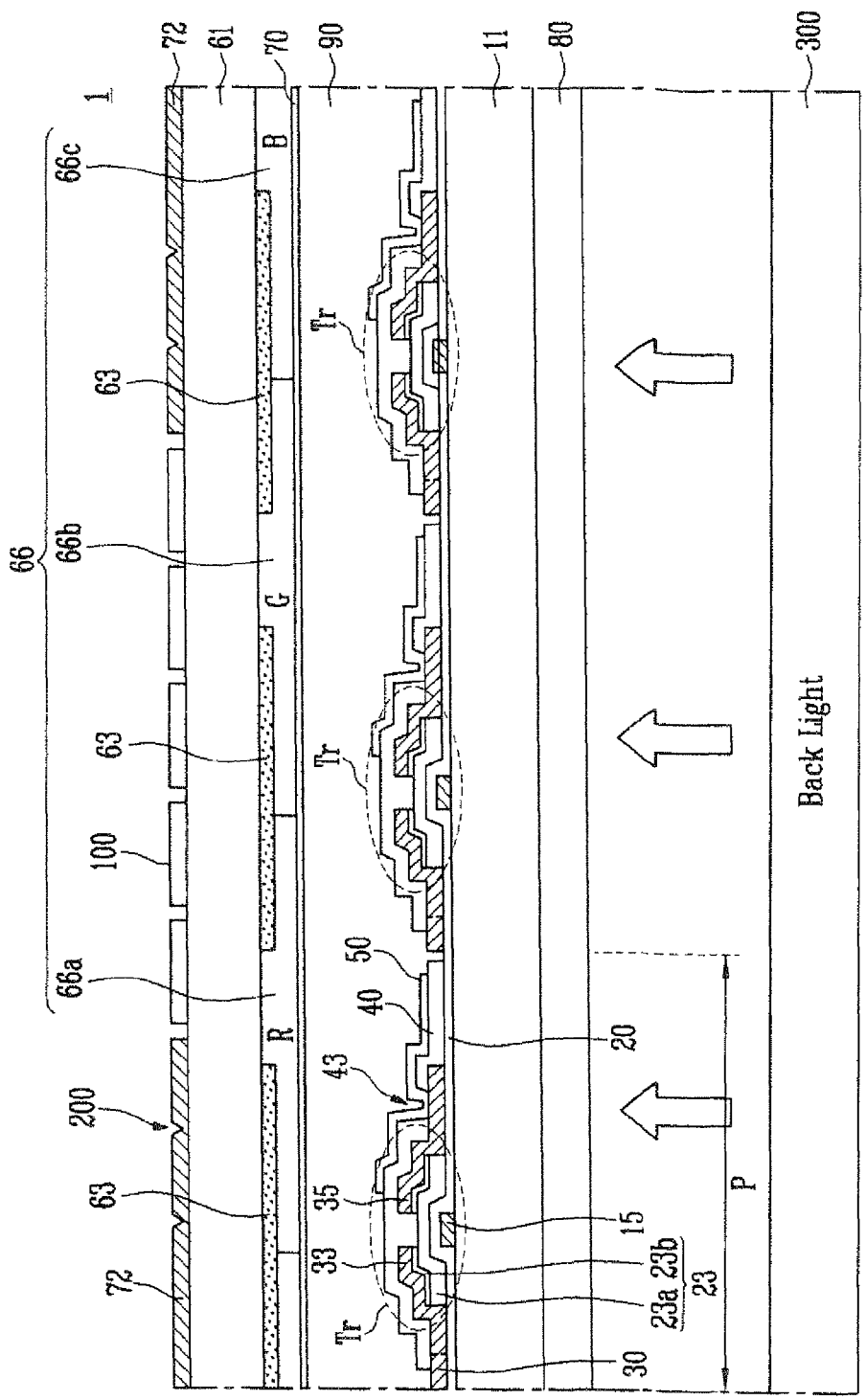
FIG. 1 is a sectional view illustrating a region of a display device integrated with a touch screen panel according to an embodiment of the present invention.

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or indirectly on the element with one or more intervening elements interposed therebetween. Also, when an element is referred to as being "connected to" another element, it can be directly connected to the element or indirectly connected to the element with one or more intervening elements interposed therebetween. Hereinafter, like reference numerals refer to like elements.

Hereinafter, the embodiment of the present invention will be described in detail with reference to the accompanying drawings.

Figure 2:
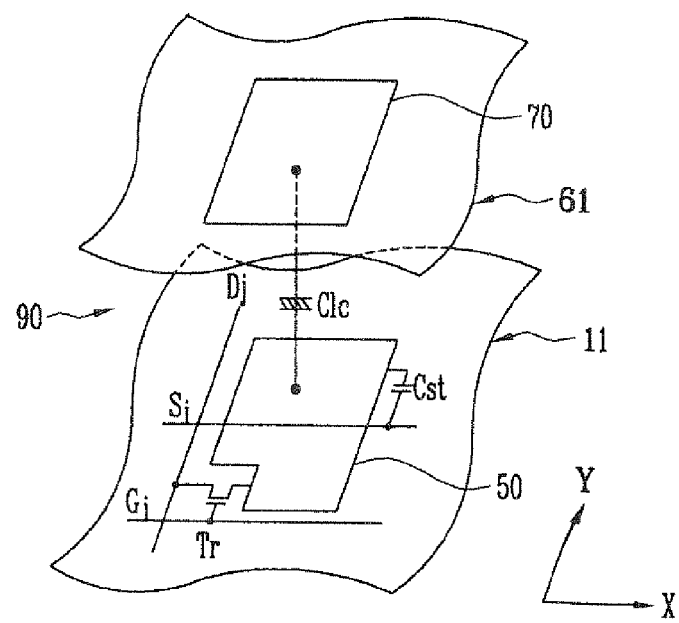
FIG. 2 is an equivalent circuit diagram illustrating a pixel of FIG. 1.

FIG. 1 is a sectional view illustrating a region of a display device integrated with a touch screen panel according to an embodiment of the present invention, and FIG. 2 is an equivalent circuit diagram illustrating a pixel of FIG. 1.

A liquid crystal display (LCD) is illustrated in FIGS. 1 and 2. However, the above is only an embodiment and the embodiment of the present invention is not limited to the above. That is, the display device may be realized by an organic light emitting display other than the LCD.

The LCD is a display device for realizing an image using optical anisotropy and a polarization property of liquid crystal. The liquid crystal has optical anisotropy in which molecules are thin and long, and are arranged with directional property and polarization property in which the direction of arrangement of molecules changes in accordance with the size of the molecules when the molecules are put in an electric field.

The LCD is a non-emissive element that includes a liquid crystal panel formed by adhering a first substrate (an array substrate) on which pixel electrodes are formed and a second substrate (a color filter substrate) on which a common electrode is formed, the first and second substrates facing each other with a liquid crystal layer interposed as an essential component. The LCD is a non-emissive element that also artificially controls the direction of arrangement of liquid crystal molecules through a change in an electric field between the electrodes, and that displays various images using the transmittance of light that changes when the direction of arrangement of the liquid crystal molecules is artificially controlled.

Referring to the embodiment illustrated in FIGS. 1 and 2, an LCD 1 has a structure in which a first substrate 11 as an array substrate and a second substrate 61 as a color filter substrate face each other and are adhered to each other with a liquid crystal layer 90 interposed therebetween. The bottom first substrate 11 includes a plurality of gate wiring lines (not shown) arranged to vertically and horizontally intersect each other and data wiring lines 30 on the top surface thereof. Thin film transistors (TFT) Tr are provided at intersections of the gate wiring lines and the data wiring lines 30 so as to be coupled to pixel electrodes 50 formed in pixels P so as to correspond to the pixel electrodes 50 one to one.

In addition, according to the embodiment of the present invention, storage wiring lines (not shown) are alternately arranged between the gate wiring lines (not shown) so as to transmit sustain signals to the pixels P.

At this time, the gate wiring lines and the storage wiring lines are arranged in a first direction (for example, in an X axis direction) and the data lines 30 are arranged in a second direction (for example, a Y axis direction) intersecting the first direction.

Referring to FIG. 2, for example, the pixel P coupled to an ith gate wiring line Gi and a jth data wiring line Dj includes a TFT Tr coupled to the gate wiring line Gi and the data wiring line Dj, a liquid crystal capacitor Clc coupled to the TFT Tr, and a storage capacitor Cst coupled to the TFT Tr and to an ith storage wiring line Si.

Referring to FIG. 1, the TFT Tr includes a gate electrode 15 and source and drain electrodes 33 and 35, respectively, coupled to the gate wiring line (not shown) and a semiconductor layer 23 formed between the gate electrode 15 and the source and drain electrodes 33 and 35, respectively. Here, the semiconductor layer 23 includes an active layer 23a and an ohmic contact layer 23b.

In addition, a gate insulating layer 20 is formed on the gate electrode 15, a protective layer 40 is formed on the source and drain electrodes 33 and 35, respectively, and the protective layer 40 includes a contact hole 43 through which the drain electrode 35 is exposed.

In addition, the pixel electrode 50 is formed on the protective layer 40 so as to be coupled to the drain electrode 33 through the contact hole 43.

The liquid crystal capacitor Clc of FIG. 2 uses the pixel electrode 50 and the common electrode 70 of the second substrate 61 as two terminals. The liquid crystal layer 90 disposed between the two electrodes 50 and 70 functions as a dielectric substance.

The storage capacitor Cst is formed of first and second electrodes (not shown) and an insulating layer (for example, the gate insulating layer 20 of FIG. 1) provided between the first electrode and the second electrode. At this point, the first electrode or the second electrode is realized by the storage wiring line Si of FIG. 2 or is electrically coupled to the storage wiring line Si.

In addition, referring to FIG. 1, the following elements are provided on the back surface of the second substrate 61 that faces the first substrate 11: latticed black matrixes 63 that surround the pixel regions P so as to cover non-display regions such as the gate wiring lines, the storage wiring lines, the data wiring lines, and the TFTs; red, green and blue color filter patterns 66a, 66b, and 66c sequentially and repeatedly arranged in the black matrixes 63 so as to correspond to the pixels P; and the common electrode 70 formed under the color filter pattern 66 of a transparent conductive material.

Here, an overcoat layer (not shown) may be further formed between the color filter pattern 66 and the common electrode 70.

In the embodiment illustrated in FIGS. 1 and 2, since a backlight 300 is positioned below the first substrate 11, an image is displayed in a direction of the second substrate 61.

An image displaying operation of the LCD 1 having the above structure will be briefly described as follows.

First, when a gate signal is applied to the gate electrode 15 of the TFT Tr provided in each of the pixels P, the active layer 23a is activated so that the drain electrode 35 receives a data signal applied from the data wiring line 30 (coupled to the source electrode 33) through the source electrode 33 (separated by a predetermined distance) and through the active layer 23a under the drain electrode 35.

At this point, since the drain electrode 35 is electrically coupled to the pixel electrode 50 through the contact hole 43, the voltage of the data signal is applied to the pixel electrode 50 of FIGS. 1 and 2 and is stored in the storage capacitor Cst of FIG. 2.

The arrangement of liquid crystal molecules between the pixel electrode 50 and the common electrode 70 is controlled so as to correspond to the voltage corresponding to a difference between the voltage applied to the pixel electrode 50 and the voltage applied to the common electrode 70 so that a predetermined image is displayed.

The LCD according to the embodiment of the present invention includes the electrodes of the touch screen panel in order to recognize a touch and to display an image.

That is, according to the embodiment of the present invention, the electro-capacitive touch screen panel is integrated with the LCD to form first electrodes (sensing electrodes) 72 of the touch screen panel on the second substrate 61 which is the top substrate of the display device, and to use second electrodes (driving electrodes) 70a (see FIG. 3) corresponding to the first electrodes 72 as conductive wiring lines provided in the display device.

In the case of a conventional LCD, the common electrode 70 is integrated with the entire bottom surface of the second substrate 61 so as to receive the same voltage.

However, in the LCD according to the embodiment of the present invention, the common electrode 70 is formed of a plurality of separated patterns so that the patterns are used as the second electrodes 70a of the mutual electro-capacitive touch screen panel.

For example, the common electrode 70 is formed of a plurality of patterns arranged so as to be separated from each other by a predetermined distance in a first direction (for example, an X axis direction) so that the patterns are used as the second electrodes (driving electrodes) 70a of the touch screen panel, and the first electrodes (sensing electrodes) 72 of the touch screen panel are formed on the second substrate 61.

At this point, the first electrodes 72 as the sensing electrodes are realized by a plurality of patterns arranged so as to be separated from each other by a predetermined distance in a second direction (for example, a Y axis direction) which intersects the first direction.

Here, the first electrodes 72 are formed of a transparent conductive material (for example, indium tin oxide (ITO)) and may be realized by attaching a film in which the transparent conductive material is patterned onto the second substrate 61 or through a photolithography process.

Since the first electrodes 72 are positioned in the outermost side of the display device on which a touch of a user is performed, the patterns of the first electrodes 72 may be visible to the user.

According to the embodiment of the present invention, as illustrated in FIG. 1, a plurality of floated island-shaped dummy patterns 100 are formed between the first electrodes 72.

That is, the floated dummy patterns, to which signals are not applied, are formed between the first electrodes 72 so that it is possible to reduce pattern visibility in comparison with the case in which only the first electrodes 72 are formed in stripes without affecting the performance of a touch recognizing operation.

However, in the above-described structure, since the first electrodes 72 are arranged in stripes and the dummy patterns 100 are realized by a plurality of separated island-shaped patterns between the first electrodes 72, the first electrodes 72 and the dummy patterns 100 have different arrangement structures.

Since the degree of scattering light by external light of the first electrodes 72 is different from the degree of scattering light by external light of the dummy patterns 100, although the dummy patterns 100 are provided, it is not possible to prevent the first electrodes 72 in stripes from being visible.

In order to solve the problem, according to the embodiment of the present invention, in the structure where the plurality of floated dummy patterns 100 are provided between the first electrodes 72, light scattering patterns 200 corresponding to regions between the dummy patterns 72 are formed in partial regions of the first electrodes 72.

The structure and operation of the electrodes of the electro-capacitive touch screen panel according to the embodiment of the present invention will be described in detail with reference to FIGS. 3 and 4.

Figure 3:
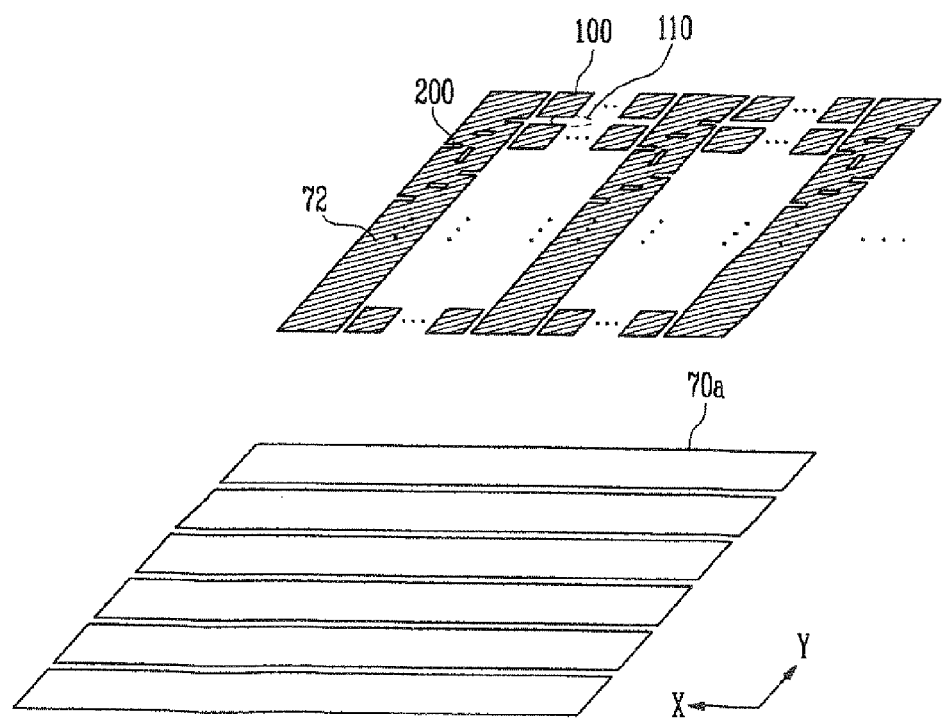
FIG. 3 is a perspective view schematically illustrating structures of the first electrodes and the second electrodes of FIG. 1.

FIG. 3 is a perspective view schematically illustrating structures of the first electrodes and the second electrodes of FIG. 1.

First, referring to FIG. 3, the operation of the touch screen panel will be described as follows.

As described above with reference to FIGS. 1 and 2, in the touch screen panel according to the embodiment of the present invention, the common electrode is formed of the plurality of patterns arranged so as to be separated from each other by a predetermined distance in the first direction (for example, the X axis direction) so that the patterns are used as the driving electrodes (the second electrodes) 70a of the touch screen panel, and the sensing electrodes (the first electrodes) 72 corresponding to the driving electrodes 70a are realized by forming the plurality of patterns arranged so as to be separated by a predetermined distance in the second direction (for example, the Y axis direction) that intersects the first direction on the second substrate 61.

In addition, the second substrate 61 provided between the driving electrodes 70a and the sensing electrodes 72 functions as a dielectric substance 110 (see FIG. 3).

Mutual capacitances $C_M$ between the driving electrodes 70a and the sensing electrodes 72 are formed at the points where the driving electrodes 70a and the sensing electrodes 72 intersect each other. The intersections at which the mutual capacitances $C_M$ are formed function as sensing cells for recognizing a touch.

Here, the mutual capacitances generated at the sensing cells apply coupled sensing signals to the sensing electrodes 72 coupled to the sensing cells when driving signals are applied to the driving electrodes 70a coupled to the sensing cells.

In addition, since the driving signals are sequentially applied to the driving electrodes 70a in one frame period, when a driving signal is applied to one of the driving electrodes 70a, the other driving electrodes 70a maintain a grounding state.

Therefore, the mutual capacitances are formed at the plurality of intersections between the driving electrodes 70a to which the driving signals are applied and the plurality of sensing electrodes 72, that is, at the sensing cells. When a finger contacts a sensing cell, a change in capacitance is generated in the corresponding sensing cell so that contact may be sensed.

In the above-described structure, according to the embodiment of present invention, the LCD integrated with the mutual electro-capacitive method may be realized.

In this case, the same voltage is applied to the common electrode patterns 70*a* in a first frame period where the LCD displays a predetermined image, and the driving signals are sequentially applied to the common electrode patterns 70*a* in a second frame period where a touch is recognized.

At this time, the first frame does not overlap the second frame. For example, the first and second frames may be sequentially and alternately operated.

In addition, according to the embodiment of the present invention, the plurality of floated island-shaped dummy patterns 100 are formed between the first electrodes 72.

That is, the floated dummy patterns 100, to which signals are not applied, are formed between the first electrodes 72 so as to prevent the first electrodes 72, arranged in stripes, from being visible without affecting the performance of the touch recognizing operation.

However, since the first electrodes 72 are arranged in stripes and the dummy patterns 100 are realized by a plurality of separated island-shaped patterns between the first electrodes 72, the first electrodes 72 and the dummy patterns 100 have different arrangement structures as illustrated in FIG. 3.

Since the degree of scattering light by external light of the first electrodes 72 is different from the degree of scattering light by external light of the dummy patterns 100, although the dummy patterns 100 are provided, it is not possible to prevent the first electrodes 72 in stripes from being visible.

That is, since the first electrodes 72 are in stripes, the degree of scattering light by external light is small. However, since the plurality of dummy patterns 100 are separated from each other in the form of islands, light is scattered in boundary regions where the dummy patterns 100 are separated from each other, that is, in regions 110 between the dummy patterns 100. As a result, the first electrodes 72 without the boundary regions are visible as dark lines at a specific viewing angle.

According to the embodiment of the present invention, as illustrated in FIG. 3, the light scattering patterns 200 corresponding to the regions 110 between the dummy patterns 100 are formed in partial regions of the first electrodes 72.

At this point, the light scattering patterns 200 may be realized by patterning the partial regions of the first electrodes 72 so as to be engraved, or may be realized by apertures. Therefore, since light is scattered by the light scattering patterns 200 in the first electrodes 72, it is possible to prevent the first electrodes 72 from being visible.

Figure 4A:
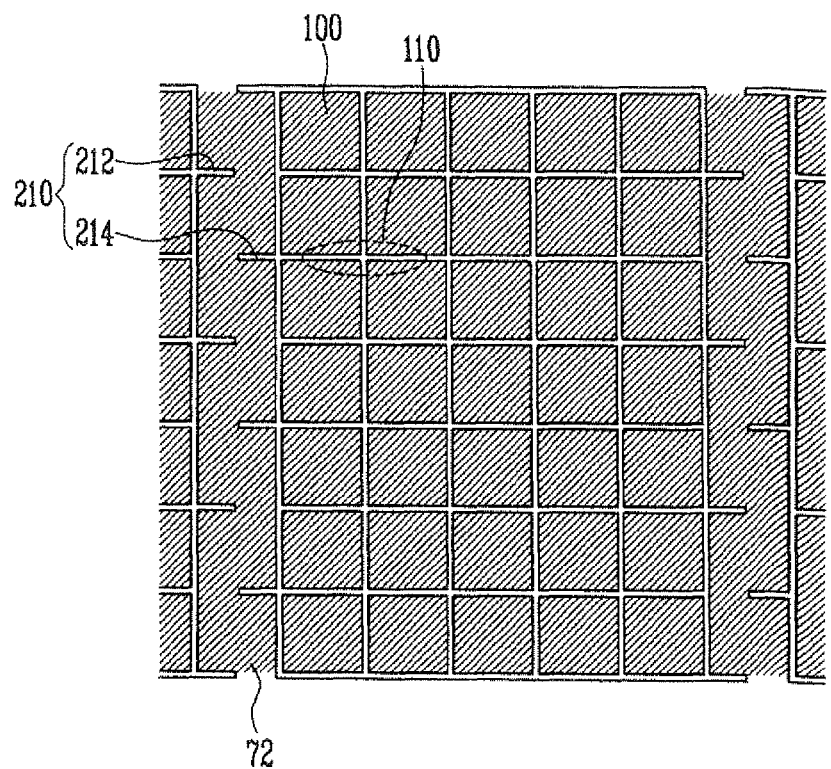
FIGS. 4A to 4C are planar views illustrating first electrodes and dummy patterns according to the embodiment of the present invention.
Figure 4B:
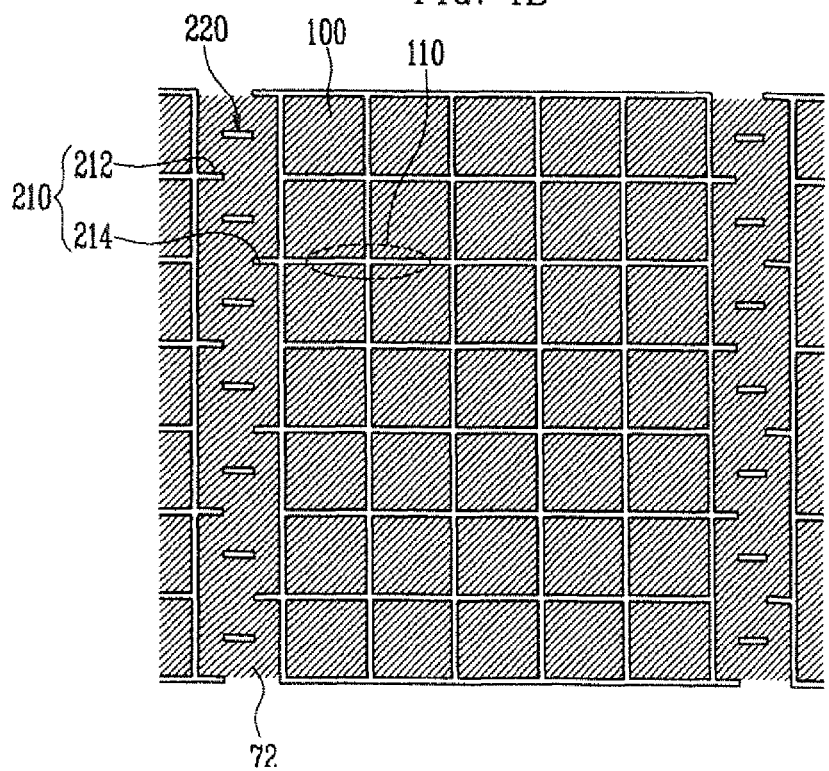
Figure 4C:
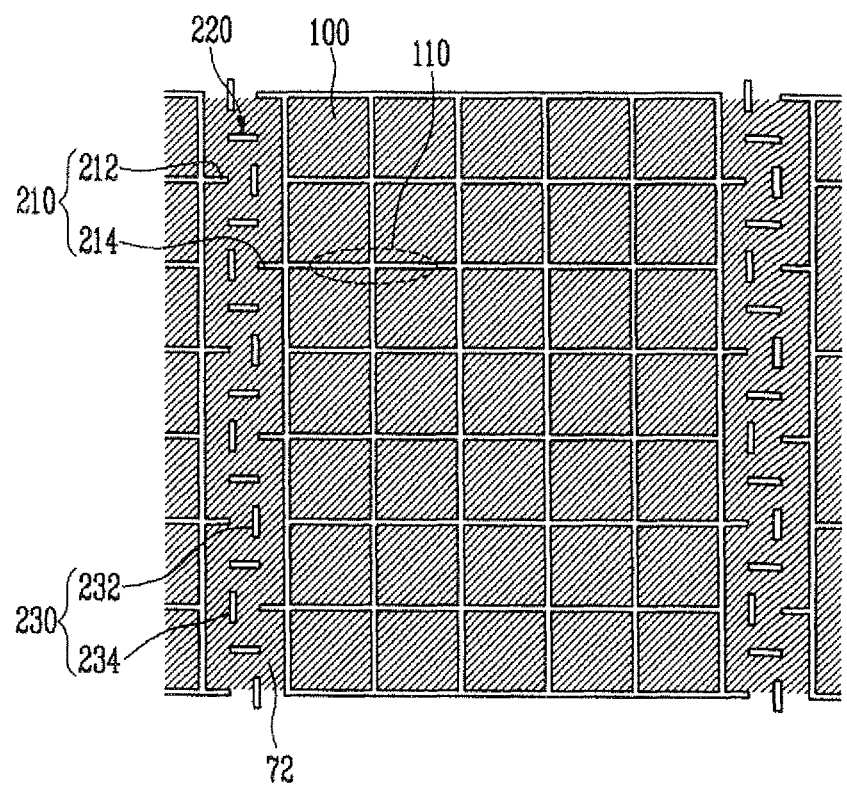

FIGS. 4A to 4C are planar views illustrating first electrodes and dummy patterns according to the embodiment of the present invention.

Referring to FIGS. 4A to 4C, the plurality of floated island-shaped dummy patterns 100 are formed between the first electrodes 72 arranged in the second direction (for example, the Y axis direction).

In FIGS. 4A to 4C, the distance between adjacent first electrodes 72 is illustrated so as to be large, and the dummy patterns 100 provided between the first electrodes 72 are illustrated so as to be large for convenience sake. However, actually, the distance between the first electrodes 72 is much smaller.

At this point, light scattering patterns 210, 220, and 230 are formed in partial regions of the first electrode 72. As described above, the light scattering patterns are realized by patterning the partial regions of the first electrodes 72 so as to be engraved, or are realized by the apertures.

First, in the embodiment of FIG. 4A, the light scattering patterns are realized as the first light scattering patterns 210 formed so as to protrude from the left and right ends of the first electrodes 72 to the interior, that is, in the first direction (the X axis direction).

In addition, first light scattering patterns 212 positioned at the left end of the first electrode and first light scattering patterns 214 positioned at the right end of the first electrode are arranged so as to cross each other. The first light scattering patterns 210 are arranged to run parallel with the boundaries of the dummy patterns adjacent thereto, that is, the regions 110 between the dummy patterns.

Next, in the embodiment of FIG. 4B, the first light scattering patterns 210 according to the embodiment of FIG. 4A are maintained, and the second light scattering patterns 220 arranged to run parallel with the first light scattering patterns 210, that is, in the first direction (the X axis direction) are further formed in the center of the first electrode 72.

At this point, the second light scattering patterns 220 are positioned between the first light scattering patterns 212 and 214 adjacent from side to side.

Next, in the embodiment of FIG. 4C, the first and second light scattering patterns 210 and 220, respectively, according to the embodiment of FIG. 4B are maintained, and the third light scattering patterns 230 arranged in the direction perpendicular to the first and second light scattering patterns 210 and 220, respectively, that is, in the second direction (the Y axis direction), are further formed in the center of the first electrode 72.

At this point, the third light scattering patterns 230 are positioned between the adjacent second light scattering patterns 220, and third light scattering patterns 232 and 234, respectively, adjacent above and below are arranged to cross each other.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device integrated with a touch screen panel, comprising:
   a first substrate on which a plurality of pixels are formed;
   a second substrate positioned to face the first substrate, and having a plurality of first electrodes arranged in stripes extending in a lengthwise direction formed on one surface thereof; and
   a plurality of island-shaped dummy patterns formed between the plurality of first electrodes;
   light scattering patterns being formed in partial regions of the first electrodes;
   the light scattering patterns at left and right ends of one of the plurality of first electrodes are non-symmetrical such that an axis of the first electrode perpendicular to the lengthwise direction of the first electrode does not simultaneously overlap the light scattering patterns at the left ends and the light scattering patterns at the right ends,
   shapes of the light scattering patterns at the left ends are symmetrical to shapes of the light scattering patterns at the right ends, and
   the light scattering patterns at one of the left end or the right end are offset and separated from the light scattering patterns at the other one of the left end or the right end by a length of a continuous straight edge of one of the plurality of dummy patterns.

2. The display device integrated with a touch screen panel as claimed in claim 1, the light scattering patterns being patterned so as to be engraved or are realized by apertures.

3. The display device integrated with a touch screen panel as claimed in claim 1, the light scattering patterns comprising first light scattering patterns formed so as to protrude from left and right ends of the first electrode to an interior of the first electrode.

4. The display device integrated with a touch screen panel as claimed in claim 3, the first light scattering patterns positioned at a left end of the first electrode and the first light scattering patterns positioned at a right end of the first electrode being arranged to offset and parallel to each other.

5. The display device integrated with a touch screen panel as claimed in claim 3, the first light scattering patterns being arranged to run parallel with regions between dummy patterns adjacent thereto.

6. The display device integrated with a touch screen panel as claimed in claim 5, the light scattering patterns further comprising second light scattering patterns arranged to run parallel with the first light scattering patterns in a center of the first electrode.

7. The display device integrated with a touch screen panel as claimed in claim 6, the second light scattering patterns being positioned between the first light scattering patterns adjacent from side to side.

8. The display device integrated with a touch screen panel as claimed in claim 6, the light scattering patterns further comprising third light scattering patterns arranged in a direction perpendicular to the first and second light scattering patterns in the center of the first electrode.

9. The display device integrated with a touch screen panel, comprising:
    a first substrate on which a plurality of pixels are formed;
    a second substrate positioned to face the first substrate, and having a plurality of first electrodes arranged in stripes extending in a lengthwise direction formed on one surface thereof;
    a plurality of island-shaped dummy patterns formed between the plurality of first electrodes; and
    light scattering patterns being formed in partial regions of the first electrodes,
    the light scattering patterns comprising:
        first light scattering patterns formed so as to protrude from left and right ends of the first electrode to an interior of the first electrode;
        second light scattering patterns arranged to run parallel with the first light scattering patterns in a center of the first electrode; and
        third light scattering patterns arranged in a direction perpendicular to the first and second light scattering patterns in the center of the first electrode,
    the first light scattering patterns being arranged to run parallel with regions between dummy patterns adjacent thereto,
    the third light scattering patterns being positioned between adjacent second light scattering patterns, and top of each of the third light scattering patterns is adjacent to one of the adjacent second light scattering patterns, bottom of the third scattering patterns is adjacent to another one of the adjacent second light scattering patterns.

10. The display device integrated with a touch screen panel as claimed in claim 1, the first electrodes being arranged on a top surface of a second substrate, and second electrodes, arranged in a direction that intersects the first electrodes, being formed on a bottom surface of the second substrate.

11. The display device integrated with a touch screen panel as claimed in claim 10, the first electrodes operating as sensing electrodes of the touch screen panel, and the second electrodes operating as driving electrodes of the touch screen panel.

* * * * *